(12) United States Patent
Duan et al.

(10) Patent No.: US 11,702,947 B2
(45) Date of Patent: Jul. 18, 2023

(54) ROTATING MACHINE

(71) Applicant: MITSUBISHI HEAVY INDUSTRIES, LTD., Tokyo (JP)

(72) Inventors: Chongfei Duan, Tokyo (JP); Hideaki Sugishita, Tokyo (JP); Kazuyuki Matsumoto, Tokyo (JP); Hideki Ono, Tokyo (JP); Yoshihiro Kuwamura, Tokyo (JP); Kiyoshi Segawa, Kanagawa (JP); Hisataka Fukushima, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 158 days.

(21) Appl. No.: 17/422,391

(22) PCT Filed: Nov. 13, 2019

(86) PCT No.: PCT/JP2019/044478
§ 371 (c)(1),
(2) Date: Jul. 12, 2021

(87) PCT Pub. No.: WO2020/158106
PCT Pub. Date: Aug. 6, 2020

(65) Prior Publication Data
US 2022/0120188 A1    Apr. 21, 2022

(30) Foreign Application Priority Data

Jan. 31, 2019  (JP) .................................. 2019-015196

(51) Int. Cl.
*F01D 11/02* (2006.01)
*F01D 11/08* (2006.01)
(Continued)

(52) U.S. Cl.
CPC .............. *F01D 11/02* (2013.01); *F16J 15/447* (2013.01); *F05D 2220/31* (2013.01); *F05D 2240/55* (2013.01)

(58) Field of Classification Search
CPC .......... F01D 11/02; F01D 11/08; F01D 5/225; F02C 7/28
See application file for complete search history.

(56) References Cited

U.S. PATENT DOCUMENTS 5,088,889 A  *  2/1992  Wolff ..................... F16J 15/406
                                                        277/423
9,879,786 B2 *  1/2018  Kuwamura .......... F16J 15/3292
(Continued)

FOREIGN PATENT DOCUMENTS

| JP | 2007321721 A | 12/2007 |
| JP | 2014234714 A | 12/2014 |
| JP | 5985351 B2   | 8/2016  |

OTHER PUBLICATIONS

"Examination report under sections 12 & 13 of the Patents Act, 1970 and the Patents Rules, 2003.", Indian Application No. 202147031979, dated Mar. 22, 2022, 5 pp.

*Primary Examiner* — Long T Tran
(74) *Attorney, Agent, or Firm* — Myers Bigel, P.A.

(57) ABSTRACT

A rotating machine includes a rotating body rotatably supported in a casing; a rotor blade fixed to an outer peripheral portion of the rotating body; a stator blade arranged on a downstream side in a fluid flow direction with respect to the rotor blade and fixed to an inner peripheral portion of the casing; a sealing device arranged between the inner peripheral portion and a front end of the rotor blade; a swirling flow generation chamber provided in the casing on the downstream side from the sealing device along a circumferential direction of the rotating body; and guiding members provided in the swirling flow generation chamber along a radial (Continued)

direction of the rotating body and in the circumferential direction at predetermined intervals. The swirling flow generation chamber has a wall surface located on the downstream side from an edge of the stator blade on an upstream side.

10 Claims, 5 Drawing Sheets

(51) Int. Cl.
  *F02C 7/28* (2006.01)
  *F16J 15/447* (2006.01)

(56) References Cited

U.S. PATENT DOCUMENTS

| | | | |
|---|---|---|---|
| 2011/0247345 A1* | 10/2011 | Laurello | F01D 5/081 |
| | | | 60/806 |
| 2014/0119901 A1 | 5/2014 | Shibata et al. | |
| 2015/0132114 A1* | 5/2015 | Fukushima | F01D 11/08 |
| | | | 415/168.1 |
| 2017/0016342 A1 | 1/2017 | Shibata et al. | |
| 2018/0156044 A1* | 6/2018 | Clark | F23R 3/005 |
| 2018/0363466 A1* | 12/2018 | Gallier | F01D 5/187 |
| 2020/0011206 A1* | 1/2020 | Murakami | F01D 25/30 |
| 2020/0165927 A1* | 5/2020 | Kawashita | F16J 15/447 |

* cited by examiner

ROTATING MACHINE

RELATED APPLICATIONS

This application is a 35 U.S.C. § 371 national stage application of PCT Application No. PCT/JP2019/044478, filed on Nov. 13, 2019, which claims priority from Japanese Patent Application No. 2019 015196 filed on Jan. 31, 2019, the contents of which are incorporated herein by reference in their entireties. The above-referenced PCT International Application was published in the Japanese language as International Publication No. WO 2020/158106 A1 on Aug. 6, 2020.

FIELD

The present invention relates to a rotating machine in which a sealing device for suppressing fluid leakage between a stationary side and a rotating side is arranged.

BACKGROUND

For example, a steam turbine is configured such that a rotor is rotatably supported in a casing by bearings, and multiple stages of rotor blades are fixed to the rotor while multiple stages of stator blades are fixed to the casing so as to be located between the multiple stages of rotor blades. When steam is supplied from a supply port of the casing, the steam passes through the rotor blades and the stator blades to allow the rotor to be driven and rotated via the rotor blades, and is discharged to the outside from a discharge port.

In such a steam turbine, a sealing device is provided between tips of the rotor blades and the casing to suppress the axial leakage flow of the steam between the casing and the tips of the rotor blades. In general, the sealing device is applied to a labyrinth seal. The labyrinth seal is configured by providing a plurality of seal fins on the tip of the rotor blade or an inner surface of the casing. By forming a gap between the seal fins and the inner surface of the casing or the tip of the rotor blade, a pressure ratio at the rear and front of each seal fin is reduced to suppress a leakage flow rate.

The flow of steam leaking from the sealing device merges into the main flow of the steam having passed through the rotor blades or the stator blades. The main flow of the steam having passed through the rotor blades is a flow along the axial direction of the rotor, the flow of the steam leaking from the sealing device without passing through the rotor blades is a flow that is inclined toward the rotor side from the inner circumferential surface of the casing and swirls in the circumferential direction of the rotor by the stator blades. In such a case, it is important to reduce mixing loss at a merging portion and suppress performance degradation by allowing the flow of the leakage steam from the sealing device to smoothly merge into the main flow of the steam. As such a technology, there is a technology disclosed in Patent Literature 1 below.

CITATION LIST

Patent Literature

Patent Literature 1: Japanese Patent. No. 5985351

SUMMARY

Technical Problem

In an axial flow turbine of Patent Literature 1 described above, a swirling flow adjustment chamber is provided on a downstream side from seal fins and a plurality of shielding plates extending in the axial direction and the radial direction of a swirl ng flow adjustment rotor are fixed. Therefore, the flow of steam leaking from a sealing device without passing through rotor blades and swirling in the circumferential direction decreases in velocity component in the circumferential direction by the shielding plates, so that the flow of the leakage steam from the sealing device can smoothly merge into the main flow of steam. However, in the axial flow turbine according to the related art, since the shielding plate has a plate shape extending in the axial direction and the radial direction of the rotor, when the flow of steam along the circumferential direction collides with the shielding plate, a separation vortex may be generated at a connection portion of the shielding plate, resulting in pressure loss.

The present invention has been made to solve the problems described above and an object of the present invention is to provide a rotating machine capable of reducing mixing loss at a merging portion and improving performance by allowing a fluid leaking from a sealing device to smoothly merge into the main flow of a fluid.

Solution to Problem

In order to achieve the object, a rotating machine according to the present invention includes a casing having a hollow shape; a rotating body rotatably supported in the casing; a rotor blade fixed to an outer peripheral portion of the rotating body; a stator blade arranged on a downstream side in a fluid flow direction with respect to the rotor blade and fixed to an inner peripheral portion of the casing; a sealing device arranged between the inner peripheral portion of the casing and a tip of the rotor blade; a swirling flow generation chamber provided in the casing on the downstream Fide in the fluid flow direction from the sealing device along a circumferential direction of the rotating body; and a plurality of guiding members provided in the swirling flow generation chamber along a radial direction of the rotating body and in the circumferential direction of the rotating body at predetermined intervals. The swirling flow generation chamber has a wall surface on the downstream side in the fluid flow direction, the wall surface being located on the downstream side in the fluid flow direction from an edge portion of the stator blade on an upstream side in the fluid flow direction.

Consequently, when a fluid is supplied to the inside of the casing, the main flow of the fluid passes through the stator blade and the rotor blade to rotate the rotor blade, a part of the fluid passes through the stator blade and then flows between the casing and the tip of the rotor blade, but the sealing device serves to suppress the leakage of the fluid. At this time, a part of the fluid leaks from the sealing device, and the leakage fluid swirls in the swirling flow generation chamber and then merges into the main flow of the fluid having passed through the stator blade and the rotor blade. Since the leakage fluid leaking from the sealing device has a velocity component in the circumferential direction because it passes through the stator blade but does not pass through the rotor blade. Here, the leakage fluid with the velocity component in the circumferential direction is guided by the guiding members when flowing into the swirling flow generation chamber, so that the velocity component in the circumferential direction is reduced. The leakage fluid with the reduced velocity component in the circumferential direction swirls in the swirling flow generation chamber and then interferes with a leakage fluid that flows into the swirling flow generation chamber and has the velocity component in the circumferential direction, so that a vortex flow is generated. At this time, since the swirling flow generation chamber is located on the downstream side in the fluid flow direction from the edge portion of the stator blade, the volume of the swirling flow generation chamber is large, so that the generated vortex flow can be confined and the leakage fluid with the reduced velocity component in the circumferential direction smoothly merges into the main flow of the fluid. As a consequence, by allowing the fluid leaking from the sealing device to smoothly merge into the main flow of the fluid, it is possible to reduce mixing loss at the merging portion and improve performance.

In the rotating machine according to the present invention, the swirling flow generation chamber has an inner circumferential surface of the casing, a first wall surface facing the downstream side in the fluid flow direction with respect to the sealing device in the casing, and a second wall surface facing inward in the radial direction of the rotating body with respect to the inner circumferential surface of the casing, the plurality of guiding members are fixed at least to the inner circumferential surface of the casing and the first wall surface, and the first wall surface serving as the wall surface is located on the downstream side in the fluid flow direction from the edge portion of the stator blade on the upstream side in the fluid flow direction.

Consequently, the first wall surface to which the guiding member is fixed is located on the downstream side in the fluid flow direction from the edge portion of the stator blade on the upstream side in the fluid flow direction, so that it is possible to reduce the velocity component in the circumferential direction of the leakage fluid by the guiding members, and to confine the generated vortex flow in the swirling flow generation chamber by increasing the volume of the swirling flow generation chamber.

In the rotating machine according to the present invention, a recessed portion is formed in the inner circumferential surface of the casing, the tip of the rotor blade is arranged in the recessed portion with a predetermined gap, the swirling flow generation chamber is provided in the recessed portion on the downstream side in the fluid flow direction and has an inner circumferential surface of the recessed portion, the first wall surface provided in the recessed portion, and the second wall surface provided on a protrusion extending from the inner circumferential surface of the casing toward the upstream side in the fluid flow direction, and the first wall surface is located on the downstream side in the fluid flow direction from the edge portion of the stator blade on the upstream side in the fluid flow direction.

Consequently, the swirling flow generation chamber is provided in the recessed portion in which the tip of the rotor blade is arranged, and the first wall surface constituting the swirling flow generation chamber is located on the downstream side in the fluid flow direction from the edge portion of the stator blade on the upstream side in the fluid flow direction, so that it is possible to confine the generated vortex flow in the swirling flow generation chamber by increasing the volume of the swirling flow generation chamber.

In the rotating machine according to the present invention, an end portion of the protrusion on the upstream side in the fluid flow direction is located on the upstream side in the fluid flow direction from an end portion of each guiding member on the upstream side in the fluid flow direction.

Consequently, since the end portion of the protrusion is located on the upstream side in the fluid flow direction from the end portion of the guiding member, an exit of the leakage fluid merging into the main flow of the fluid from the swirling flow generation chamber is narrowed, so that a vortex flow that is generated by interference between a leakage fluid that is discharged from the swirling flow generation chamber and has a reduced velocity component in the circumferential direction, and a leakage fluid that flows into the swirling flow generation chamber and has a velocity component in the circumferential direction, can be easily confined in the swirling flow generation chamber.

In the rotating machine according to the present invention, an end portion of each guiding member on the upstream side in the fluid flow direction is located on the upstream side in the fluid flow direction from an end portion of the protrusion on the upstream side in the fluid flow direction.

Consequently, since the end portion of the guiding member is located on the upstream side in the fluid flow direction from the end portion of the protrusion, a leakage fluid that has flowed into the swirling flow generation chamber is guided by the guiding members, so that the velocity component in the circumferential direction is reduced and the intensity of the leakage fluid is reduced with an increase in abrasion due to contact with the guiding members. Therefore, it is possible to reduce a vortex flow generated by interference between a leakage fluid that is discharged from the swirling flow generation chamber and has a reduced velocity component in the circumferential direction and a leakage fluid that flows into the swirling flow generation chamber and has a velocity component in the circumferential direction.

In the rotating machine according to the present invention, a communication section is provided between the guiding members and the second wall surface to communicate in the circumferential direction of the rotating body.

Consequently, the communication section is provided between the guiding member and second wall surface, so that a vortex flow generated by interference between a leakage fluid that is discharged from the swirling flow generation chamber and has a reduced velocity component in the circumferential direction and a leakage fluid that flows into the swirling flow generation chamber and has a velocity component in the circumferential direction can be confined in the communication section of the swirling flow generation chamber and its vortex intensity can be reduced.

In the rotating machine according to the present invention, the communication section is provided from the tip of the rotor blade to outside in the radial direction of the rotating body.

Consequently, the communication section is provided from the tip of the rotor blade to the outside, so that the generated vortex flow can be properly confined in the communication section of the swirling flow generation chamber and its vortex intensity can be reduced.

In the rotating machine according to the present invention, a shroud is fixed to the tip of the rotor blade and is provided on the downstream side in the fluid flow direction with a first guiding surface extending toward the communication section.

Consequently, the first guiding surface extending toward the communication section is provided on the downstream side of the shroud fixed to the rotor blade, so that it is possible to properly guide a leakage flow from the sealing device to the communication section.

In the rotating machine according to the present invention, the shroud is provided on the downstream side in the fluid flow direction with a second guiding surface facing inward in the radial direction of the rotating body.

Consequently, the second guiding surface facing inward in the radial direction is provided on the downstream side of the shroud, so that it is possible to allow a leakage fluid merging into the main flow of the fluid from the swirling flow generation chamber to smoothly merge into the main flow by the second guiding surface.

In the rotating machine according to the present invention, each guiding member includes a first guiding body that is located inside in the radial direction of the rotating body, and a second guiding body that is located outside in the radial direction of the rotating body and extends from the first guiding body toward the upstream side in the fluid flow direction.

Consequently, since the first guiding body that is located inside in the radial direction, and the second guiding body that is located outside in the radial direction and extends from the first guiding body toward the upstream side, are provided as the guiding members, the intensity of the leakage fluid that has flowed into the swirling flow generation chamber is reduced before being guided by the guiding members and then the leakage fluid is guided by the first guide bodies and the second guide bodies, so that a velocity component in the circumferential direction is reduced and the intensity of the leakage fluid is reduced with an increase in abrasion due to contact with the second guide bodies. Therefore, it is possible to reduce a vortex flow generated by interference between a leakage fluid that is discharged from the swirling flow generation chamber and has a reduced velocity component in the circumferential direction and a leakage fluid that flows into the swirling flow generation chamber and has a velocity component in the circumferential direction.

Advantageous Effects of Invention

With the rotating machine according to the present invention, it is possible to reduce mixing loss at a merging portion and improve performance by allowing a fluid leaking from the sealing device to smoothly merge into the main flow of a fluid.

DESCRIPTION OF EMBODIMENTS

Hereinafter, preferred embodiments of a rotating machine according to the present invention will be described in detail with reference to the accompanying drawings. Note that the present invention is not limited by the embodiments, and furthermore, when there are a plurality of embodiments, the present invention also includes those configured by combining those embodiments.

First Embodiment

Figure 4:
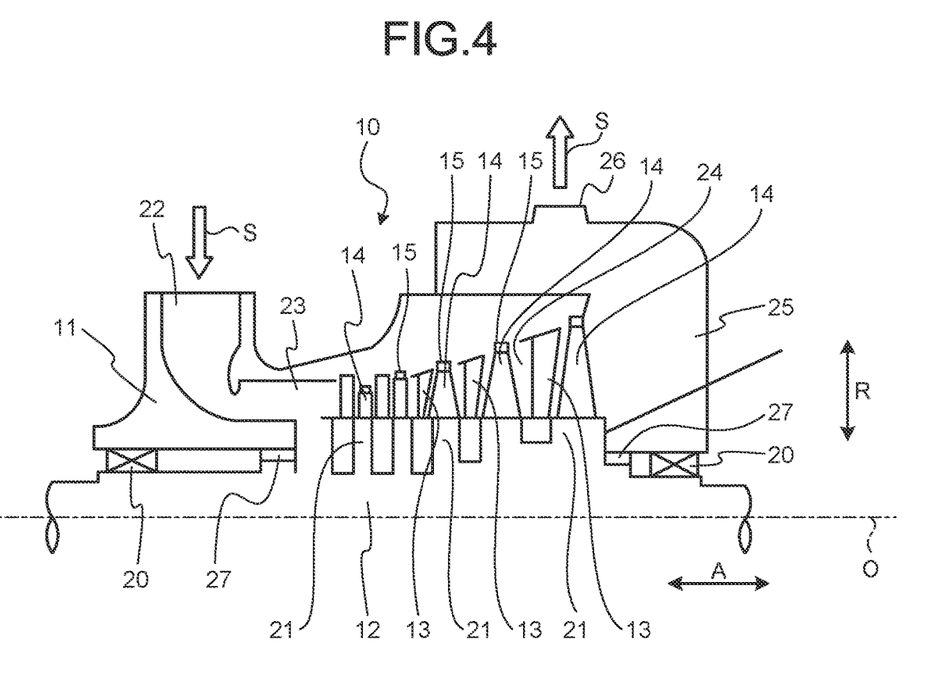
FIG. 4 is a schematic view illustrating the steam turbine of the first embodiment.

FIG. 4 is a schematic view illustrating a steam turbine of a first embodiment. In the following description, the axial direction of a rotor is indicated by A, the radial direction of the rotor is indicated by R, and the circumferential direction of the rotor is indicated by C.

In the present embodiment, a steam turbine will be described as an example of a rotating machine according to the present invention. As illustrated in FIG. 4, a steam turbine 10 includes a casing 11, a rotor (rotating body) 12, stator blades 13, rotor blades 14, and sealing devices 15.

The casing 11 has a hollow shape and the rotor 12 is arranged inside the casing 11 along the horizontal direction. The rotor 12 is rotatably supported around a center axis O by bearings 20 provided in the casing 11. A plurality of stator blades 13 are fixed to an inner peripheral portion of the casing 11 at predetermined intervals in the axial direction A of the rotor 12. A plurality of rotor discs 21 are fixed to an outer peripheral portion of the rotor 12 at predetermined intervals in the axial direction A, and a plurality of rotor blades 14 are fixed to outer peripheral portions of the rotor discs 21, respectively. The stator blades 13 and the rotor blades 14 are arranged along the radial direction R of the rotor 12, are arranged at predetermined intervals in the circumferential direction of the rotor 12, and are alternately arranged along the axial direction A of the rotor 12.

The casing 11 is provided on one end side thereof in the axial direction A with a steam inlet 22, and the steam inlet 22 is communicated with a blade cascade part 24 in which the stator blades 13 and the rotor blades 14 are arranged, through a steam passage 23. The blade cascade part 24 is communicated with a steam discharge port 26 through an exhaust hood 25.

Furthermore, the rotor 12 is provided with a sealing member 27 between each end portion in the axial direction A and the casing 11. Each sealing member 27 is arranged inward from each bearing 20, that is, on the side of the stator blade 13 and the rotor blade 14. Moreover, the sealing device 15 is provided between the tip of the rotor blade 14 located outside the radial direction R and the inner peripheral portion of the casing 11.

Therefore, when steam S is supplied from the steam inlet 22 to the blade cascade part 24 through the steam passage 23, the steam S passes through the stator blades 13 and the rotor blades 14, so that the rotor 12 is driven and rotated via each rotor blade 14 to drive a generator (not illustrated) connected to the rotor 12. Thereafter, the steam S having driven the rotor blades 14 is discharged from the steam discharge port 26 through the exhaust hood 25.

Figure 1:
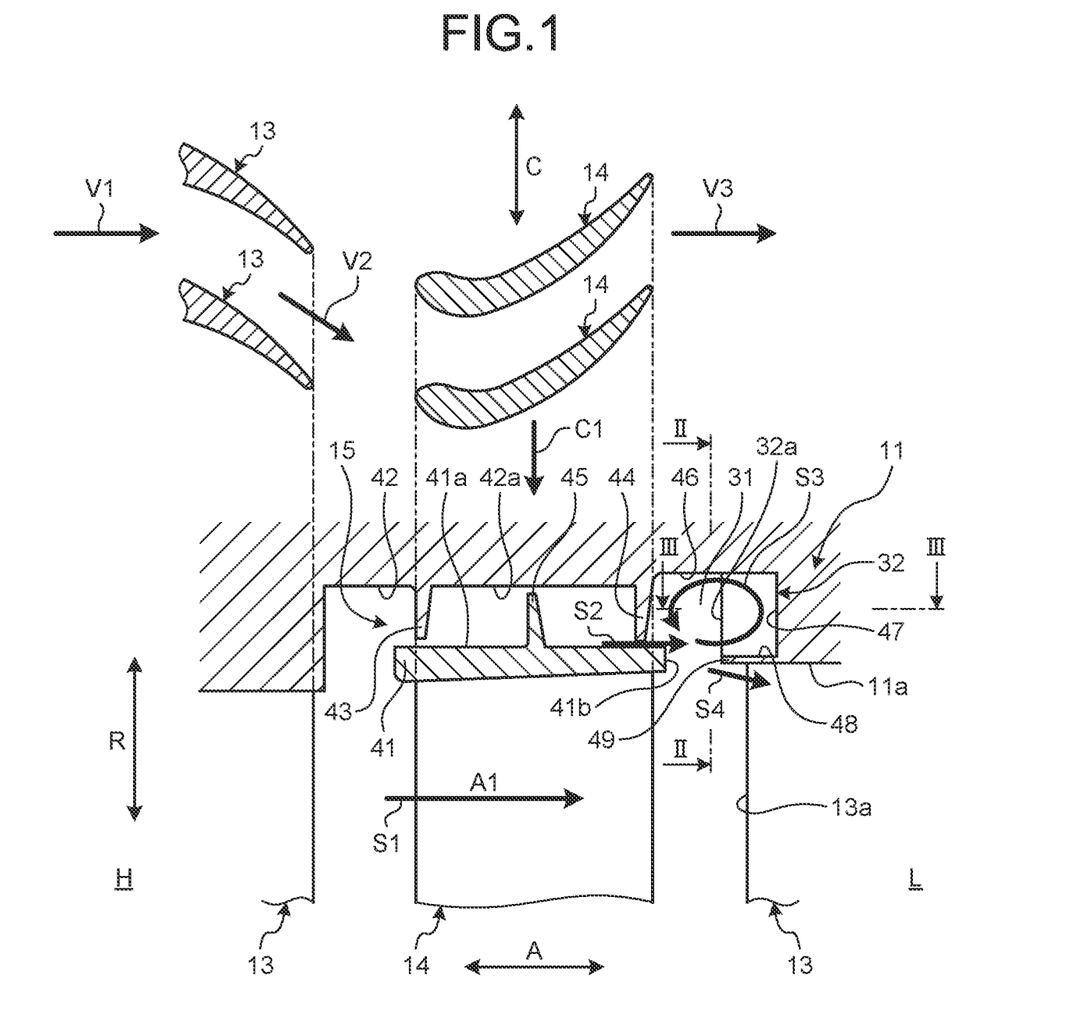
FIG. 1 is a sectional view of main elements for explaining the flow of steam in a steam turbine as a rotating machine of a first embodiment.

Hereinafter, the relation among the casing 11, the stator blades 13, the rotor blades 14, and the sealing device 15 in the aforementioned steam turbine 10 will be described in detail. FIG. 1 is a sectional view of main elements for explaining the flow of steam in the steam turbine as the rotating machine of the first embodiment, FIG. 2 is a sectional view taken along line II-II of FIG. 1, and FIG. 3 is a sectional view taken along line III-III of FIG. 1.

Figure 2:
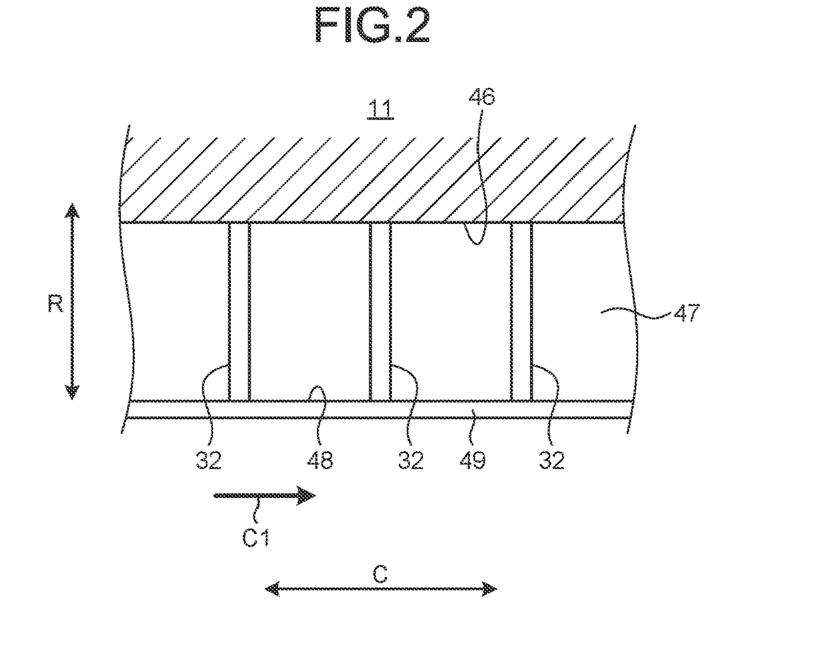
FIG. 2 is a sectional view taken along line II-II of FIG. 1.
Figure 3:
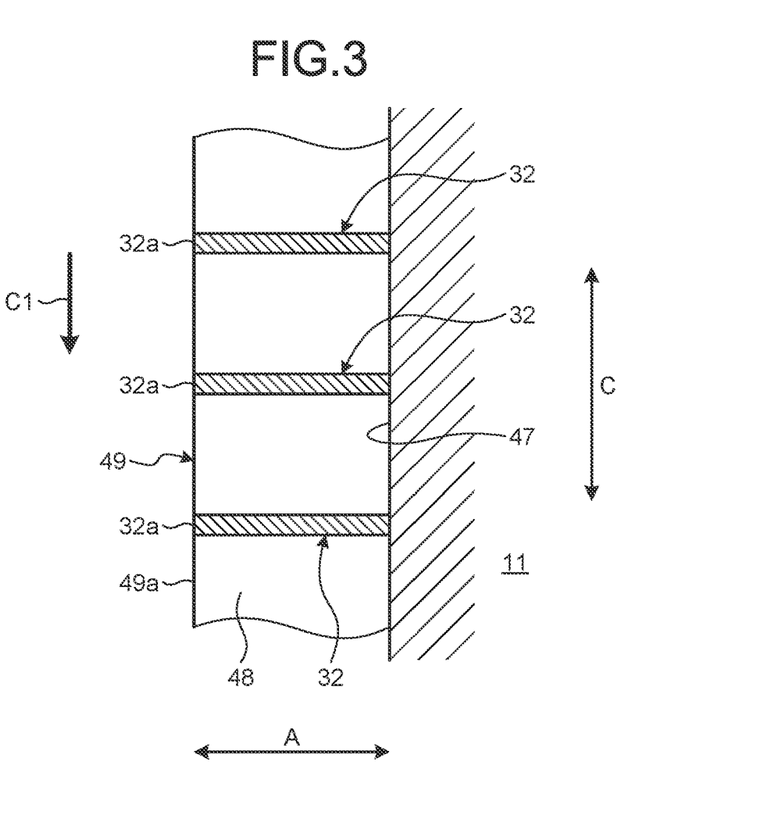
FIG. 3 is a sectional view taken along line III-III of FIG. 1.

As illustrated in FIG. 1 to FIG. 3, the sealing device 15 is provided between the casing 11 and the tip of the rotor blade 14. The sealing device 15 suppresses the leakage of the flow of the steam (fluid) S that flows between the casing 11 and the tip of the rotor blade 14 from a high-pressure side H to a low-pressure side L along the axial direction A of the rotor 12. Here, the steam S flows from the high-pressure side H to the low-pressure side L, and main flow steam S1 flows along a steam flow direction A1 to pass through the stator blades 13 and the rotor blades 14. Furthermore, after the main flow steam S1 passes through the stator blades 13, a part of the main flow steam S1 flows to the sealing device 15 between the casing 11 and the tip of the rotor blade 14 and is generated as leakage steam S2 that leaks from the sealing device 15. Since the leakage steam S2 passes through the stator blades 13, but does not pass through the rotor blades 14, the leakage steam S2 has a velocity component in the circumferential direction C.

That is, the main flow steam S1 is a flow in the axial direction A with almost no velocity component in the circumferential direction C, and flows into a leading edge side of the stator blade 13 at an absolute velocity vector V1. The main flow steam S1 is accelerated and turned when passing through between the stator blades 13, becomes an absolute velocity vector V2 with the velocity component in the circumferential direction C, and flows out from a trailing edge side of the stator blade 13. Most of the steam S that has flowed out from the stator blade 13 collides with the rotor blade 14, thereby rotating the rotor 12 together with the rotor blade 14 in a rotational direction C1 at a predetermined rotation speed. At this time, the steam S is decelerated and turned when passing through the rotor blade 14, and becomes an absolute velocity vector V3 along the axial direction A that has almost no velocity component in the circumferential direction C. However, even when the main flow steam S1 is a flow with the velocity component in the circumferential direction C, the operation of rotating the rotor blade 14 is the same.

On the other hand, the absolute velocity vector V2 of the steam S having passed through between the stator blades 13 has the velocity component in the circumferential direction C, and the leakage steam S2 leaking from the sealing device 15 without passing through the rotor blade 14 is a flow with the velocity component in the circumferential direction C although its velocity changes due to acceleration/deceleration by seal fins to be described later and viscosity friction of a side wall and a cover. Therefore, when the leakage steam S2 merges into the main flow steam S1 with the absolute velocity vector V3 having almost no velocity component in the circumferential direction C, mixing loss occurs at the merging portion.

So far, an impulse turbine in which the main flow steam S1 has almost no velocity component in the circumferential direction C has been described, but even in the case of a reaction turbine in which the main flow steam S1 has the velocity component in the circumferential direction C, since direction vectors of the main flow steam S1 and the leakage steam S2 are different from each other, mixing loss occurs at the merging portion as in the impulse turbine. The present invention is also applicable and effective for the reaction turbine.

The steam turbine 10 of the first embodiment includes a swirling flow generation chamber 31 and a plurality of guiding members 32. The swirling flow generation chamber 31 is provided in the casing 11 on a downstream side in the steam flow direction A1 from the sealing device 15 along the circumferential direction C of the rotor 12. The guiding members 32 are provided in the swirling flow generation chamber 31 along the radial direction R of the rotor 12 and in the circumferential direction C of the rotor 12 at predetermined intervals.

A base end portion of the stator blade 13 located outside in the radial direction R is fixed to the inner peripheral portion of the casing 11, and a base end portion of the rotor blade 14 located inside in the radial direction R is fixed to the outer peripheral portion of the rotor 12 (see FIG. 4). The rotor blade 14 is arranged between the stator blades 13 arranged at predetermined intervals in the axial direction A. The rotor blade 14 is provided at the tip thereof located outside in the radial direction R with a shroud 41. The sealing device 15 is arranged between the inner peripheral portion of the casing 11 and an outer peripheral portion of the shroud 41 of the rotor blade 14.

The casing 11 is provided with a recessed portion 42 on an inner circumferential surface 11a thereof, which faces the outer peripheral portion of the shroud 41. The recessed portion 42 is an annular groove provided along the circumferential direction C of the rotor 12. The shroud 41 of the rotor blade 14 is arranged in the recessed portion 42 of the casing 11 with a predetermined gap. The sealing device 15 has a plurality of seal fins 43, 44, 45. Base end portions of the seal fins 43 and 44 are fixed to an inner circumferential surface 42a of the recessed portion 42 of the casing 11, and tips of the seal fins 43 and 44 extend toward an outer circumferential surface 41a of the shroud 41 of the rotor blade 14. The seal fin 45 is arranged between the seal fins 43 and 44, and has a base end portion fixed to the outer circumferential surface 41a of the shroud 41 of the rotor blade 14 and a tip extending toward the inner circumferential surface 42a of the recessed portion 42 of the casing 11.

The seal fins 43, 44, 45 are provided at predetermined intervals in the axial direction A of the rotor 12. The seal fins 43, 44, 45 are provided along the circumferential direction C of the rotor 12. A predetermined gap is secured between the tips of the seal fins 43 and 44 and the outer circumferential surface 41a of the shroud 41. Furthermore, a predetermined gap is secured between the tip of the seal fin 45 and the inner circumferential surface 42a of the recessed portion 42. The respective gaps are set to substantially the same dimensions. Note that the number and mounting positions of the seal fins 43, 44, 45 are not limited to those described above.

The length of the recessed portion 42 of the casing 11 in the axial direction A is longer than that of the shroud 41 of the rotor blade 14 in the axial direction A. That is, the recessed portion 42 is provided from an upstream side in the steam flow direction A1 from a leading edge of the rotor blade 14 toward the downstream side in the steam flow direction A1 from a trailing edge of the rotor blade 14. The swirling flow generation chamber 31 is provided in the recessed portion 42 on the downstream side in the steam flow direction A1 from the trailing edge of the rotor blade 14. The swirling flow generation chamber 31 has an inner circumferential surface 46 of the casing 11 (recessed portion 42), a first wall surface 47 facing the downstream side in the steam flow direction A1 with respect to the sealing device 15 in the casing 11, and a second wall surface 48 facing the inside in the radial direction R of the rotor 12 (see FIG. 4) with respect to the inner circumferential surface 11a of the casing 11. Here, in the swirling flow generation chamber 31, the first wall surface 47 on the downstream side in the steam flow direction A1 is located on the downstream side in the steam flow direction A1 from a leading edge portion 13a of the stator blade 13 on the upstream side in the steam flow direction A1.

That is, the inner circumferential surface 46 is located outside in the radial direction R from the inner circumferential surface 42a of the recessed portion 42, and is continuous along the circumferential direction C. The first wall surface 47 is a surface parallel to the radial direction R and orthogonal to the inner circumferential surface 46, and is continuous along the circumferential direction C. The first wall surface 47 is located on the downstream side in the steam flow direction A1 from the leading edge portion 13a of the stator blade 13 fixed to the inner circumferential surface 11a on the inside in the radial direction R of the rotor 12 from the swirling flow generation chamber 31. The casing 11 is provided with a protrusion 49 that is formed on the downstream side in the steam flow direction A1 in the recessed portion 42 and extends from the inner circumferential surface 11a of the casing 11 toward the upstream side (recessed portion 42 side) in the steam flow direction A1. The second wall surface 48 is a surface that is provided outside the protrusion 49 in the radial direction R and parallel to the inner circumferential surface 46 while being orthogonal to the first wall surface 47, and is continuous along the circumferential direction C.

The guiding member 32 has a plate shape along the radial direction R and the axial direction A of the rotor 12. The guiding member 32 is fixed to the inner circumferential surface 46, the first wall surface 47, and the second wall surface 48. The position of an end portion of the guiding member 32 on the upstream side in the steam flow direction A1 and the position of an upstream end portion of the protrusion 49 in the steam flow direction A1 are the same positions in the axial direction A. Furthermore, an end surface 32a of the guiding member 32 on the upstream side in the steam flow direction A1 is arranged apart from the seal fin 44 and the shroud 41 by a predetermined distance in the axial direction A.

Therefore, when the steam S is supplied to the inside of the casing 11 and the rotor blade 14 is rotated, the steam S flows from the high-pressure side H to the low-pressure side L along the steam flow direction A1. At this time, the steam S flows so that the main flow steam S1 passes through the stator blade 13 and the rotor blade 14, and a part of the steam S flows to the sealing device 15 provided between the casing 11 and the tip of the rotor blade 14 without passing through the rotor blades 14. Although the sealing device 15 suppresses the leakage or the steam S, a part of the steam S leaks and the leakage steam S2 is generated. The leakage steam S2 leaking from the sealing device 15 swirls in the swirling flow generation chamber 31 and then merges into the main flow steam S1 having passed through the stator blade 13 and the rotor blade 14.

At this time, the leakage steam S2 leaking from the sealing device 15 has the velocity component in the circumferential direction C because it passes through the stator blade 13 but does not pass through the rotor blade 14. The leakage steam S2 with the velocity component in the circumferential direction C becomes a swirling steam S3 having a center axis along the circumferential direction C in the swirling flow generation chamber 31. That is, the leakage steam S2 is guided by the guiding member 32 and becomes the swirling steam S3 with a reduced velocity component in the circumferential direction C. Then, the swirling steam S3 which has swirled in the swirling flow generation chamber 31 and has the reduced velocity component in the circumferential direction C, interferes with the leakage steam S2 that flows into the swirling flow generation chamber 31 and has the velocity component in the circumferential direction C, so that a vortex flow is generated. In the present embodiment, since the swirling flow generation chamber 31 is located on the downstream side in the steam flow direction A1 from the leading edge portion 13a of the stator blade 13, the volume of the swirling flow generation chamber 31 is large. Therefore, the generated vortex flow can be confined in the swirling flow generation chamber 31, and a leakage steam S4 with the reduced velocity component in the circumferential direction C passes through between the shroud 41 and the protrusion 49 and merges into the main flow steam S1 having passed through the rotor blade 14.

As described above, the rotating machine of the first embodiment includes the casing 11 having a hollow shape, the rotor 12 rotatably supported in the casing 11, the rotor blade 14 fixed to the outer peripheral portion of the rotor 12, the stator blade 13 arranged on the downstream side in the steam flow direction A1 with respect to the rotor blade 14 and fixed to the inner peripheral portion of the casing 11, the sealing device 15 arranged between the inner peripheral portion of the casing 11 and the tip of the rotor blade 14, the swirling flow generation chamber 31 provided in the casing 11 along the circumferential direction C of the rotor 12 on the downstream side in the steam flow direction A1 from the sealing device 15, and the guiding members 32 provided in the swirling flow generation chamber 31 along the radial direction R of the rotor 12 and in the circumferential direction C of the rotor 12 at predetermined intervals. In the swirling flow generation chamber 31, the first wall surface 47 on the downstream side in the steam flow direction A1 is located on the downstream side in the steam flow direction A1 from the leading edge portion 13a of the stator blade 13 on the upstream side in the steam flow direction A1.

Consequently, the leakage steam S2 with the velocity component in the circumferential direction C is guided by the guiding members 32 when flowing into the swirling flow generation chamber 31, so that the velocity component in the circumferential direction C is reduced. Then, the swirling steam S3 which has swirled in the swirling flow generation chamber 31 and has the reduced velocity component in the circumferential direction C, interferes with the leakage steam S2 that flows into the swirling flow generation chamber 31 and has the velocity component in the circumferential direction C, so that a vortex flow is generated. However, the vortex flow can be confined in the swirling flow generation chamber 31 having a large volume, and the leakage steam S4 with the reduced velocity component in the circumferential direction C smoothly merges into the main flow steam S1. As a consequence, by allowing the steam S leaking from the sealing device 15 to smoothly merge into the main flow steam S1, it is possible to reduce miming loss at the merging portion and improve performance.

In the rotating machine according to the first embodiment of the present invention, the swirling flow generation chamber 31 includes the inner circumferential surface 46 of the recessed portion 42, the first wall surface 47 facing the downstream side in the steam flow direction A1 with respect to the sealing device 15 in the casing 11, and the second wall surface 48 facing the inside in the radial direction R of the rotor 12 with respect to the inner circumferential surface 42a of the recessed portion 42, the guiding members 32 are fixed to the inner circumferential surface 46 and the first wall surface 47, and the first wall surface 47 is located on the downstream side from the leading edge portion 13a of the stator blade 13. Consequently, it is possible to reduce the velocity component in the circumferential direction C of the leakage steam S2 by the guiding members 32, and to confine the generated vortex flow in the swirling flow generation chamber 31 by increasing the volume of the swirling flow generation chamber 31.

In the rotating machine of the first embodiment, the swirling flow generation chamber 31 is provided in the recessed portion 42 on the downstream side in the steam flow direction A1, and includes the inner circumferential surface 46 of the recessed portion 42, the first wall surface 47 provided in the recessed portion 42, and the second wall surface 48 provided on the protrusion 49 extending from the inner circumferential surface 11a of the casing 11 toward the upstream side in the steam flow direction A1, and the first wall surface 47 is located on the downstream side from the leading edge portion 13a of the stator blade 13. Consequently, it is possible to confine the generated vortex flow in the swirling flow generation chamber 31 by increasing the volume of the swirling flow generation chamber 31.

Second Embodiment

Figure 5:
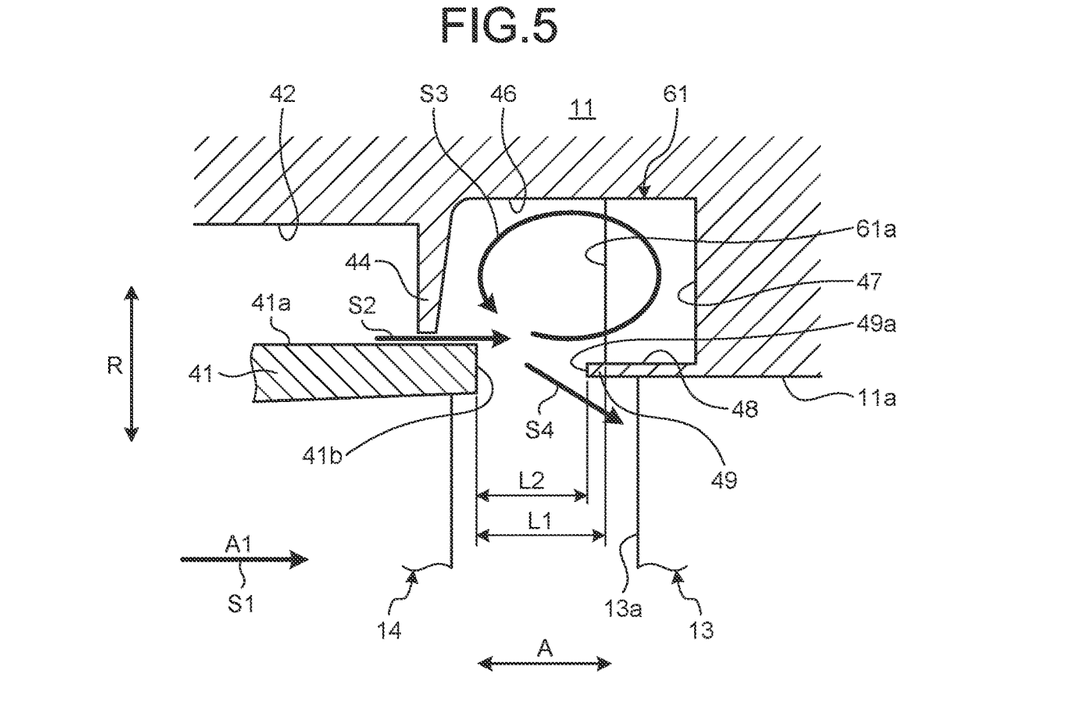
FIG. 5 is a sectional view of main elements for explaining the flow of steam in a steam turbine as a rotating machine of a second embodiment.

FIG. 5 is a sectional view of main elements for explaining the flow of steam in a steam turbine as a rotating machine according to a second embodiment. Noted that the basic configuration of the second embodiment is the same as that of the aforementioned first embodiment, members described with reference to FIG. 1 and having the same functions as those of the first embodiment are denoted by the same reference numerals, and a detailed description thereof will be omitted.

In the second embodiment, as illustrated in FIG. 1 and FIG. 5, the steam turbine 10 includes the casing 11, the rotor 12, the stator blades 13, the rotor blades 14, the sealing device 15, the swirling flow generation chamber 31, and a plurality of guiding members 61.

The swirling flow generation chamber 31 is provided in the casing 11 on the downstream side in the steam flow direction A1 from the sealing device 15 along the circumferential direction C of the rotor 12. The guiding members 61 are provided in the swirling flow generation chamber 31 along the radial direction R of the rotor 12 and in the circumferential direction C of the rotor 12 at predetermined intervals. The guiding member 61 is fixed to the inner circumferential surface 46, the first wall surface 47, and the second wall surface 48. Here, in the swirling flow generation chamber 31, the first wall surface 47 on the downstream side in the stem flow direction A1 is located on the downstream side in the steam flow direction A1 from the leading edge portion 13a of the stator blade 13 on the upstream side in the steam flow direction A1.

Furthermore, the position of the upstream end portion of the protrusion 49 in the steam flow direction A1 is located on the upstream side in the steam flow direction A1 from the position of the end portion of the guiding member 61 on the upstream side in the steam flow direction A1. That is, a distance L1 between a rear end surface 41b of the shroud 41 and an end surface 61a of the guiding member 61 on the upstream side in the steam flow direction A1 is longer than a distance L2 between the rear end surface 41b of the shroud 41 and an upstream end surface 49a of the protrusion 49 in the steam flow direction A1. That is, L1>L2.

As described above, in the rotating machine of the second embodiment, the end surface 49a of the protrusion 49 on the upstream side in the steam flow direction A1 is located on the upstream side in the steam flow direction A1 from the end surface 61a of the guiding member 61 on the upstream side in the steam flow direction A1.

Consequently, narrowing an exit of the leakage steam S4 merging into the main flow steam S1 from the swirling flow generation chamber 31, a vortex flow which is generated by interference between the swirling steam S3 that is discharged from the swirling flow generation chamber 31 and has the reduced velocity component in the circumferential direction C and the leakage steam S2 that flows into the swirling flow generation chamber 31 and has the velocity component in the circumferential direction C, can be easily confined in the swirling flow generation chamber 31.

Third Embodiment

Figure 6:
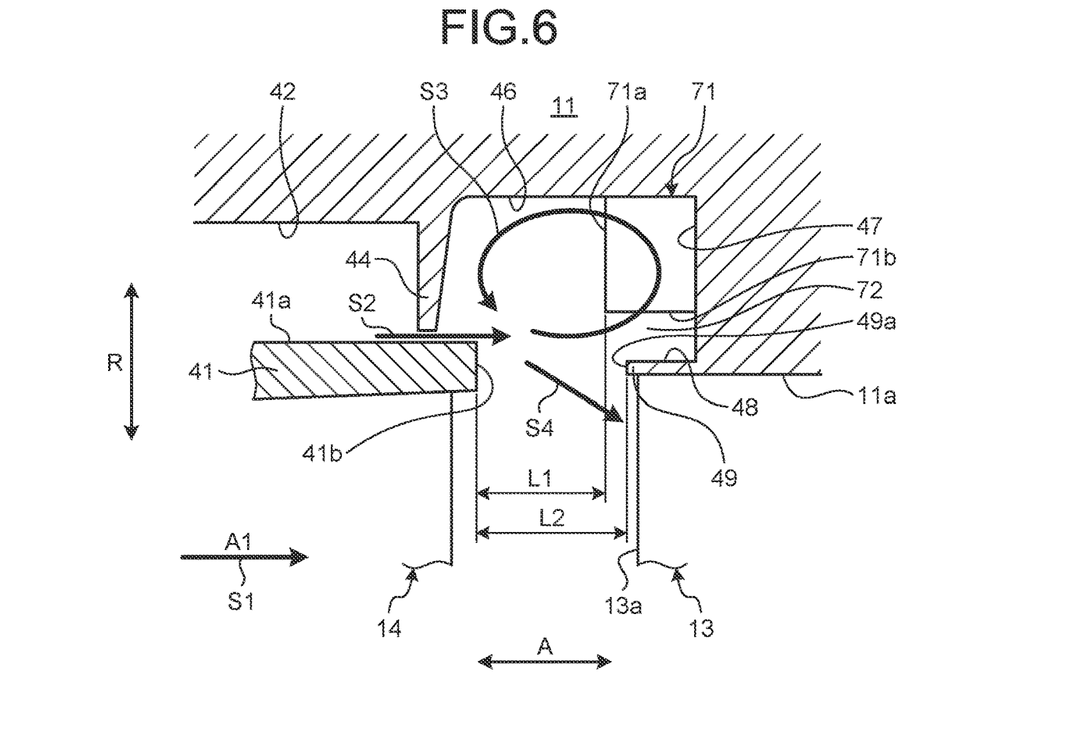
FIG. 6 is a sectional view of main elements for explaining the flow of steam in a steam turbine as a rotating machine of a third embodiment.

FIG. 6 is a sectional view of main elements for explaining the flow of steam in a steam turbine as a rotating machine according to a third embodiment. Noted that the basic configuration of the third embodiment is the same as that of the aforementioned first embodiment, members described with reference to FIG. 1 and having the same functions as those of the first embodiment are denoted by the same reference numerals, and a detailed description thereof will be omitted.

In the third embodiment, as illustrated in FIG. 1 and FIG. 6, the steam turbine 10 includes the casing 11, the rotor 12, the stator blades 13, the rotor blades 14, the sealing device 15, the swirling flow generation chamber 31, and a plurality of guiding members 71.

The swirling flow generation chamber 31 is provided in the casing 11 on the downstream side in the steam flow direction A1 from the sealing device 15 along the circumferential direction C of the rotor 12. The guiding members 71 are provided in the swirling flow generation chamber 31 along the radial direction R of the rotor 12 and in the circumferential direction C of the rotor 12 at predetermined intervals. The guiding member 71 is fixed to the inner circumferential surface 46 and the first wall surface 47. Here, in the swirling flow generation chamber 31, the first wall surface 47 on the downstream side in the steam flow direction A1 is located on the downstream side in the steam flow direction A1 from the leading edge portion 13a of the stator blade 13 on the upstream side in the steam flow direction A1.

Furthermore, an end portion of the guiding member 71 on the upstream side in the steam flow direction A1 is located on the upstream side in the steam flow direction A1 from the end portion of the protrusion 49 on the upstream side in the steam flow direction A1. That is, a distance L1 between the rear end surface 41b of the shroud 41 and an end surface 71a of the guiding member 71 on the upstream side in the steam flow direction A1 is shorter than a distance L2 between the rear end surface 41b of the shroud 41 and the upstream end surface 49a of the protrusion 49 in the steam flow direction A1. That is, L1<L2.

Furthermore, a communication section 72 is provided between the guiding member 71 and the second wall surface 48 to communicate in the circumferential direction of the rotor 12. That is, the guiding member 71 is fixed only to the inner circumferential surface 46 and the first wall surface 47 and is not fixed to the second wall surface 48, and the communication section 72 is provided here. The communication section 72 is provided from the outer circumferential surface 41a of the shroud 41 of the rotor blade 14 to the outside in the radial direction R of the rotor 12.

As described above, in the rotating machine of the third embodiment, the end surface 71a of the guiding member 71 on the upstream side in the steam flow direction A1 is located on the upstream side in the steam flow direction A1 from the end surface 49a of the protrusion 49 on the upstream side in the steam flow direction A1.

Consequently, the leakage steam S2 that has flowed into the swirling flow generation chamber 31 is guided by the guiding members 71, so that the velocity component in the circumferential direction C is reduced and the intensity of the leakage steam S2 is reduced with an increase in abrasion due to contact with the guiding members 71. Therefore, it is possible to reduce a vortex flow generated by interference between the swirling steam S3 that is discharged from the swirling flow generation chamber 31 and has the reduced velocity component in the circumferential direction C and the leakage steam S2 that flows into the swirling flow generation chamber 31 and has the velocity component in the circumferential direction C.

In the rotating machine of the third embodiment, the communication section 72 is provided between the guiding member 71 and the second wall surface 48 to communicate in the circumferential direction C of the rotor 12. Consequently, the vortex flow generated by interference between the swirling steam S3 that is discharged from the swirling flow generation chamber 31 and has the reduced velocity component in the circumferential direction C and the leakage steam S2 that flows into the swirling flow generation chamber 31 and has the velocity component in the circumferential direction C can be confined in the communication section 72 of the swirling flow generation chamber 31 and is vortex intensity can be reduced.

In the rotating machine of the third embodiment, the communication section 72 is provided from the outer circumferential surface 41a of the shroud 41 of the rotor blade 14 to the outside in the radial direction R of the rotor 12. Consequently, the generated vortex flow is properly confined in the communication section 72 of the swirling flow generation chamber 31, so that it is possible to reduce its vortex intensity.

Fourth Embodiment

Figure 7:
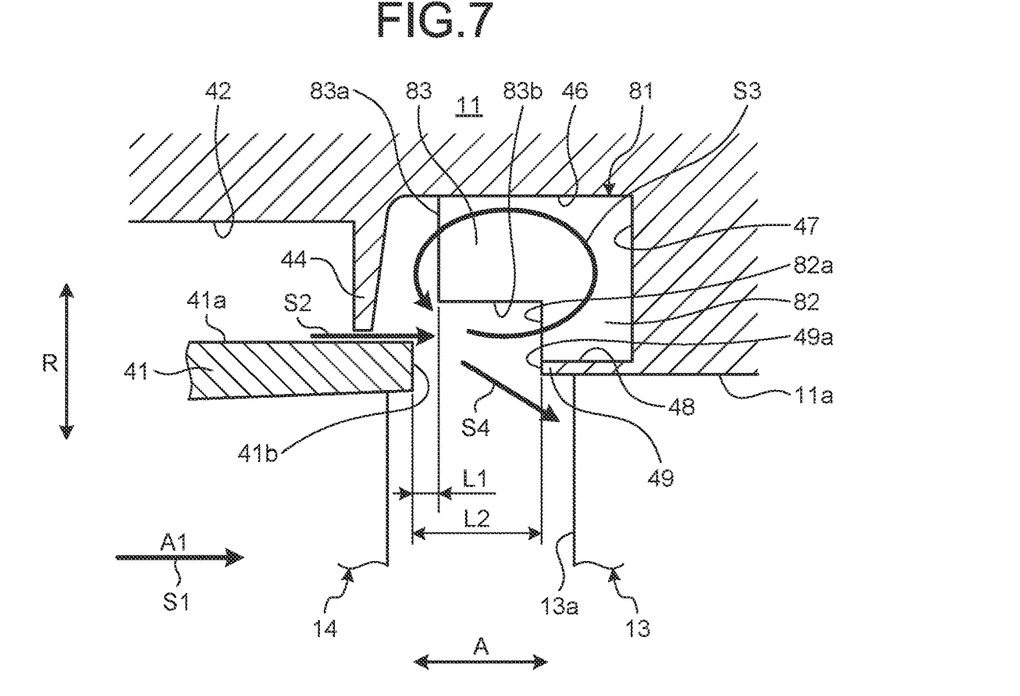
FIG. 7 is a sectional view of main elements for explaining the flow of steam in a steam turbine as a rotating machine of a fourth embodiment.

FIG. 7 is a sectional view of main elements for explaining the flow of steam in a steam turbine as a rotating machine according to a fourth embodiment. Noted that the basic configuration of the fourth embodiment is the same as that of the aforementioned first embodiment, members described with reference to FIG. 1 and having the same functions as those of the first embodiment are denoted by the same reference numerals, and a detailed description thereof will be omitted.

In the fourth embodiment, as illustrated in FIG. 1 and FIG. 7, the steam turbine 10 includes the casing 11, the rotor 12, the stator blades 13, the rotor blades 14, the sealing device 15, the swirling flow generation chamber 31, and a plurality of guiding members 81.

The swirling flow generation chamber 31 is provided in the casing 11 on the downstream side in the steam flow direction A1 from the sealing device 15 along the circumferential direction C of the rotor 12. The guiding members 81 are provided in the swirling flow generation chamber 31 along the radial direction R of the rotor 12 and in the circumferential direction C of the rotor 12 at predetermined intervals. The guiding member 81 is fixed to the inner circumferential surface 46, the first wall surface 47, and the second wall surface 48. Here, in the swirling flow generation chamber 31, the first wall surface 47 on the downstream side in the steam flow direction A1 is located on the downstream side in the steam flow direction A1 from the leading edge portion 13a of the stator blade 13 on the upstream side in the steam flow direction A1.

The guiding member 81 has a first guiding body 82 that is located inside in the radial direction R of the rotor 12, and a second guiding body 83 that is located outside in the radial direction R of the rotor 12 and extends from the first guiding body 82 toward the upstream side in the steam flow direction A1. Furthermore, the position of the upstream end portion of the protrusion 49 in the steam flow direction A1 and the position of an end portion of the first guiding body 82 on the upstream side in the steam flow direction A1 are the same in the axial direction A. That is, a distance L1 between the rear end surface 41b of the shroud 41 and an end surface 83a of the second guiding body 83 on the upstream side in the steam flow direction A1 is shorter than a distance L2 between the rear end surface 41b of the shroud 41, and the upstream end surface 49a of the protrusion 49 in the steam flow direction A1 and an upstream end surface 82a of the first guiding body 82 on the upstream side in the steam flow direction A1. That is, L1<L2.

As described above, in the rotating machine of the fourth embodiment, the guiding member 81 has the first guiding body 82 that is located inside in the radial direction R of the rotor 12, and the second guiding body 83 that is located outside in the radial direction R of the rotor 12 and extends from the first guiding body 82 toward the upstream side in the steam flow direction A1.

Consequently, the intensity of the leakage steam S2 that has flowed into the swirling flow generation chamber 31 is reduced before being guided by the guiding members 81 and then the leakage steam S2 is guided by the first guide bodies 82 and the second guide bodies 83, so that the velocity component in the circumferential direction is reduced and the intensity of the leakage steam S2 is reduced with an increase in abrasion due to contact with the second guide bodies 83. Therefore, it is possible to reduce a vortex flow generated by interference between the swirling steam S3 that is discharged from the swirling flow generation chamber 31 and has the reduced velocity component in the circumferential direction C and the leakage steam S2 that flows into the swirling flow generation chamber 31 and has the velocity component in the circumferential direction C.

Fifth Embodiment

Figure 8:
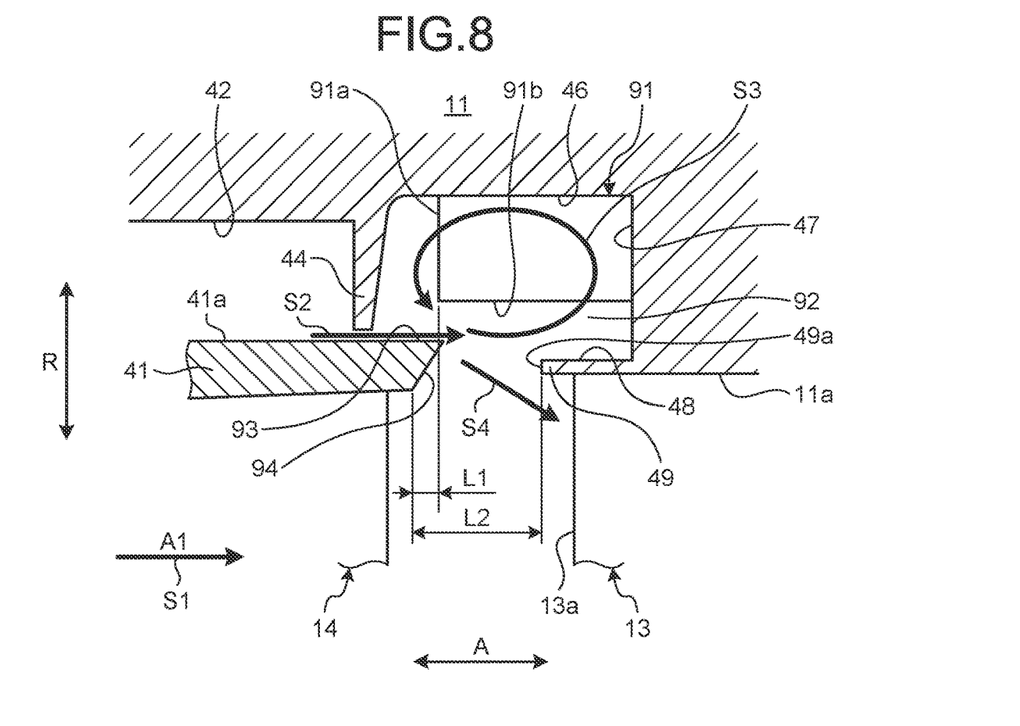
FIG. 8 is a sectional view of main elements for explaining the flow of steam in a steam turbine as a rotating machine of a fifth embodiment.

FIG. 8 is a sectional view of main elements for explaining the flow of steam in a steam turbine as a rotating machine of according to a fifth embodiment. Noted that the basic configuration of the fifth embodiment is the same as that of the aforementioned first embodiment, members described with reference to FIG. 1 and having the same functions as those of the first embodiment are denoted by the same reference numerals, and a detailed description thereof will be omitted.

In the fifth embodiment, as illustrated in FIG. 1 and FIG. 8, the steam turbine 10 includes the casing 11, the rotor 12, the stator blades 13, the rotor blades 14, the sealing device 15, the swirling flow generation chamber 31, and a plurality of guiding members 91.

The swirling flow generation chamber 31 is provided in the casing 11 on the downstream side in the steam flow direction A1 from the sealing device 15 along the circumferential direction C of the rotor 12. The guiding members 91 are provided in the swirling flow generation chamber 31 along the radial direction R of the rotor 12 and in the circumferential direction C of the rotor 12 at predetermined intervals. The guiding member 91 is fixed to the inner circumferential surface 46 and the first wall surface 47. Here, in the swirling flow generation chamber 31, the first wall surface 47 on the downstream side in the steam flow direction A1 is located on the downstream side in the steam flow direction A1 from the leading edge portion 13a of the stator blade 13 on the upstream side in the steam flow direction A1.

Furthermore, an end portion of the guiding member 91 on the upstream side in the steam flow direction A1 is located on the upstream side in the steam flow direction A1 from the end portion of the protrusion 49 on the upstream side in the steam flow direction A1. Furthermore, a communication section 92 is provided between the guiding member 91 and the second wall surface 48 to communicate in the circumferential direction of the rotor 12. That is, the guiding member 91 is fixed only to the inner circumferential surface 46 and the first wall surface 47 and is not fixed to the second wall surface 48, and the communication section 92 is provided here. The communication section 92 is provided from the outer circumferential surface 41a of the shroud 41 of the rotor blade 14 to the outside in the radial direction R of the rotor 12.

Moreover, the shroud 41 of the rotor blade 14 is provided on the outer circumferential surface 41a thereof on the downstream side in the steam flow direction A1 with a first guiding surface 93 extending toward the communication section 92, and is provided on the downstream side in the steam flow direction A1 with a second guiding surface facing inward in the radial direction R of the rotor 12. Furthermore, a distance L1 between the first guiding surface 93 of the shroud 41 and an end surface of 91a of the guiding member 91 on the upstream side in the steam flow direction A1 is shorter than a distance L2 between the rear end surface 41b of the shroud 41 and the upstream end surface 49a of the protrusion 49 in the steam flow direction A1. That is, L1<L2.

As described above, in the rotating machine of the fifth embodiment, the shroud 41 of the rotor blade 14 is provided on the outer circumferential surface 41a thereof on the downstream side in the steam flow direction A1 with the first guiding surface 93 extending toward the communication section 92. Consequently, the leakage steam S2 from the sealing device 15 can be properly guided to the communication section 92.

In the rotating machine of the fifth embodiment, the shroud 41 of the rotor blade 14 is provided on the downstream side in the steam flow direction A1 with the second guiding surface 94 facing inward in the radial direction R of the rotor 12. Consequently, the swirling steam S3 merging into the main flow steam S1 from the swirling flow generation chamber 31 can be smoothly merged into the main flow steam S1 by the second guiding surface 94.

Note that in the aforementioned embodiments, the seal device is a labyrinth seal, but may be other non-contact-type seals.

Furthermore, in the aforementioned embodiments, the rotating machine according to the present invention is applied to the steam turbine 10; however, the present invention is not limited to the steam turbine and can be applied to a rotating machine, such as a compressor and an exhaust turbine, in which internal pressure is higher than external pressure is during its operation.

REFERENCE SIGNS LIST 10 steam turbine (rotating machine)
11 casing
11a inner circumferential surface
12 rotor
13 stator blade
14 rotor blade
15 sealing device
20 bearing
21 rotor disc
22 steam inlet
23 steam passage
24 blade cascade part
25 exhaust hood
26 steam discharge port
31 swirling flow generation chamber
32, 61, 71, 81, 91 guiding member
32a, 61a, 71a, 82a, 83a, 91a end surface
41 shroud
41a outer circumferential surface
41b rear end surface
42 recessed portion
42a inner circumferential surface
43, 44, 45 seal fin
46 inner circumferential surface
47 first wall surface
48 second wall surface
49 protrusion
49a end surface
72, 92 communication section
82 first guiding body
83 second guiding body
93 first guiding surface
94 second guiding surface
a axial direction
A1 steam flow direction
C circumferential direction
C1 rotational direction
R radial direction
s steam
s1 main flow steam
s2 leakage steam
s3 swirling steam
s4 leakage steam

The invention claimed is:

1. A rotating machine comprising:
a casing having a hollow shape;
a rotating body rotatably supported in the casing;
a rotor blade fixed to an outer peripheral portion of the rotating body;
a stator blade arranged on a downstream side in a fluid flow direction with respect to the rotor blade and fixed to an inner peripheral portion of the casing;
a sealing device arranged between the inner peripheral portion of the casing and a tip of the rotor blade;
a swirling flow generation chamber provided in the casing on the downstream side in the fluid flow direction from the sealing device along a circumferential direction of the rotating body; and
a plurality of guiding members provided in the swirling flow generation chamber along a radial direction of the rotating body and in the circumferential direction of the rotating body at predetermined intervals, wherein
the swirling flow generation chamber has a wall surface on the downstream side in the fluid flow direction, the wall surface being located on the downstream side in the fluid flow direction from an edge portion of the stator blade on an upstream side in the fluid flow direction.

2. The rotating machine according to claim 1, wherein
the swirling flow generation chamber has an inner circumferential surface of the casing, a first wall surface facing the downstream side in the fluid flow direction with respect to the sealing device in the casing, and a second wall surface facing inward in the radial direction of the rotating body with respect to the inner circumferential surface of the casing, the plurality of guiding members are fixed at least to the inner circumferential surface of the casing and the first wall surface, and the first wall surface serving as the wall surface is located on the downstream side in the fluid flow direction from the edge portion of the stator blade on the upstream side in the fluid flow direction.

3. The rotating machine according to claim 2, wherein
a recessed portion is formed in the inner circumferential surface of the casing, the tip of the rotor blade is arranged in the recessed portion with a predetermined gap, the swirling flow generation chamber is provided in the recessed portion on the downstream side in the fluid flow direction and has an inner circumferential surface of the recessed portion, the first wall surface provided in the recessed portion, and the second wall surface provided on a protrusion extending from the inner circumferential surface of the casing toward the upstream side in the fluid flow direction, and the first wall surface is located on the downstream side in the fluid flow direction from the edge portion of the stator blade on the upstream side in the fluid flow direction.

4. The rotating machine according to claim 3, wherein an end portion of the protrusion on the upstream side in the fluid flow direction is located on the upstream side in the fluid flow direction from an end portion of each guiding member on the upstream side in the fluid flow direction.

5. The rotating machine according to claim 3, wherein an end portion of each guiding member on the upstream side in the fluid flow direction is located on the upstream side in the fluid flow direction from an end portion of the protrusion on the upstream side in the fluid flow direction.

6. The rotating machine according to claim 2, wherein a communication section is provided between the guiding members and the second wall surface to communicate in the circumferential direction of the rotating body.

7. The rotating machine according to claim 6, wherein the communication section is provided from the tip of the rotor blade to outside in the radial direction of the rotating body.

8. The rotating machine according to claim 1, wherein each guiding member includes a first guiding body that is located inside in the radial direction of the rotating body, and a second guiding body that is located outside in the radial direction of the rotating body and extends from the first guiding body toward the upstream side in the fluid flow direction.

9. The rotating machine according to claim 6, wherein a shroud is fixed to the tip of the rotor blade and is provided on the downstream side in the fluid flow direction with a first guiding surface extending toward the communication section.

10. The rotating machine according to claim 9, wherein the shroud is provided on the downstream side in the fluid flow direction with a second guiding surface facing inward in the radial direction of the rotating body.

* * * * *

UNITED STATES PATENT AND TRADEMARK OFFICE
CERTIFICATE OF CORRECTION

PATENT NO. : 11,702,947 B2
APPLICATION NO. : 17/422391
DATED : July 18, 2023
INVENTOR(S) : Duan et al.

Page 1 of 1

It is certified that error appears in the above-identified patent and that said Letters Patent is hereby corrected as shown below:

On the Title Page (56) References Cited, FOREIGN PATENT DOCUMENTS: Please add "JP 2004011553 A 1/2004"

(56) References Cited, FOREIGN PATENT DOCUMENTS: Please add "EP 2096262 A1 9/2009"

(56) References Cited, OTHER PUBLICATIONS: Please add ""Examination Report with English language translation", DE Application No. 112019006786.9, 04-13-2023, 26 pp"

In the Specification

Column 12, Line 1: Please correct "Consequently, narrowing an exit" to read --Consequently, by narrowing an exit--

Signed and Sealed this
Twelfth Day of September, 2023

Katherine Kelly Vidal
*Director of the United States Patent and Trademark Office*